US010142903B2

(12) United States Patent
Lee et al.

(10) Patent No.: US 10,142,903 B2
(45) Date of Patent: Nov. 27, 2018

(54) INTER-DOMAIN HANDOVER METHOD AND SYSTEM FOR USER EQUIPMENT AND RELAY GATEWAY DEVICE

(71) Applicants: WISTRON NEWEB CORPORATION, Hsinchu (TW); INDUSTRIAL TECHNOLOGY RESEARCH INSTITUTE, Hsinchu (TW)

(72) Inventors: Yi-Hsiu Lee, Hsinchu (TW); Jen-Shun Yang, Hsinchu (TW); I-Hsing Tsai, Hsinchu (TW); Szu-Hsien Huang, Hsinchu (TW); Chui-Chu Cheng, Hsinchu (TW); Feng-Zhong Hsu, Hsinchu (TW)

(73) Assignees: WISTRON NEWEB CORPORATION, Hsinchu (TW); INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/371,288

(22) Filed: Dec. 7, 2016

(65) Prior Publication Data
US 2018/0160355 A1    Jun. 7, 2018

(51) Int. Cl.
*H04L 12/28* (2006.01)
*H04W 36/18* (2009.01)
(Continued)

(52) U.S. Cl.
CPC .......... *H04W 36/18* (2013.01); *H04L 61/103* (2013.01); *H04L 61/6022* (2013.01);
(Continued)

(58) Field of Classification Search
USPC ................................ 370/252, 331, 389, 401
See application file for complete search history.

(56) References Cited

U.S. PATENT DOCUMENTS 7,602,748 B2 * 10/2009 Sinnreich ............ H04L 12/2854
370/331
7,672,288 B1 *  3/2010 Iartym .............. H04L 29/12216
370/349
(Continued)

FOREIGN PATENT DOCUMENTS

| CN | 1672439 A | 9/2005 |
|---|---|---|
| CN | 101150840 B | 8/2010 |
| TW | 201316815 A1 | 4/2013 |

OTHER PUBLICATIONS

Tien-Thinh Nguyen, et al., "SDN-Based-Distributed-Mobility-Management-for-5G-Networks", IEEE Wireless Communications and Networking Conference (WCNC 2016)—Track 3—Mobile and Wireless Networks.

*Primary Examiner* — John Pezzlo
(74) *Attorney, Agent, or Firm* — Li & Cai Intellectual Property (USA) Office

(57) ABSTRACT

A relay gateway device includes a processor and a storage, in which when a packet transmission is performed between a first mobile device and a second mobile device and the second mobile device switches from the relay gateway device to another, the IP address of the second mobile device changes from a former IP address to a current IP address. When the first mobile device transmits a first packet to the second mobile device in which the destination address of the first packet is the former IP address, the processor of the relay gateway device modifies the destination address of the first packet into the current IP address according to the former IP address and the current IP address of the second mobile device in a list of the storage and then transmits the first packet to the second mobile device, thereby achieving a seamless transmission during handover.

16 Claims, 3 Drawing Sheets

(51) Int. Cl.
  *H04W 36/08*   (2009.01)
  *H04L 29/12*   (2006.01)
  *H04J 1/16*   (2006.01)
  *H04W 88/08*   (2009.01)
  *H04W 88/16*   (2009.01)

(52) U.S. Cl.
  CPC ............ *H04W 36/08* (2013.01); *H04W 88/08* (2013.01); *H04W 88/16* (2013.01)

(56) References Cited

U.S. PATENT DOCUMENTS

| | | |
|---|---|---|
| 8,644,256 B2 | 2/2014 | Nikander et al. |
| 8,792,323 B2 | 7/2014 | Shahrier et al. |
| 9,307,393 B2 | 4/2016 | Hsu et al. |
| 2004/0203787 A1 | 10/2004 | Naghian |
| 2006/0050692 A1* | 3/2006 | Petrescu ................ H04L 29/06 370/389 |
| 2007/0189218 A1* | 8/2007 | Oba ...................... H04W 36/12 370/331 |
| 2013/0083721 A1 | 4/2013 | Wu et al. |

* cited by examiner

INTER-DOMAIN HANDOVER METHOD AND SYSTEM FOR USER EQUIPMENT AND RELAY GATEWAY DEVICE

BACKGROUND OF THE INVENTION

1. Field of the Invention

The present disclosure relates to an inter-domain handover system and a method thereof; more particularly, to an inter-domain handover method that is applied to mobile devices and is performed on a relay gateway device.

2. Description of Related Art

In the conventional handover method for mobile devices switching between base stations, the mobile device sends a request to the base station to update the IP address list thereon so that the mobile device can transmit data directly or indirectly to other electronic devices. However, the triangle routing problem is still a problem that exists in the prior art.

Therefore, providing a seamless information transmission mechanism for mobile devices during and after a handover is an important objective in the art.

SUMMARY OF THE INVENTION

Accordingly, an object of the present disclosure is to provide an inter-domain handover system, a method thereof, and a relay gateway device, in which when a mobile device undergoes a handover procedure between relay gateway devices, the relay gateway device involved in the existing connection will compare the received complex information with the stored complex information so as to determine whether or not to convert or modify certain fields in the packet so that the packet can be transmitted to the destination mobile device, achieving the effect of seamless information transmission.

In order to achieve the aforementioned objects, the present disclosure provides an inter-domain handover system for mobile devices which includes a first relay gateway device and a second relay gateway device directly or indirectly connected to the first relay gateway device, the first relay gateway device including a first processor and a first storage, the second relay gateway device including a second processor and a second storage. A packet transmission is performed between a first mobile device and a second mobile device, and the second mobile device switches from the first relay gateway device to the second relay gateway device. The inter-domain handover system performs an inter-domain handover method, which includes: the second processor determines that the second mobile device has joined the domain of the second relay gateway device; the second processor broadcasts a complex information of the second mobile device, in which the complex information includes an identification code and a current IP address; and the first processor updates a first list of the first storage according to the complex information of the second mobile device. After the step in which the first processor updates a first list of the first storage according to the complex information of the second mobile device, the identification code and the current IP address correspond to a former IP address of the second mobile device in the first list. When the first mobile device transmits a first packet to the second mobile device in which the destination address of the first packet is the former IP address, the first processor modifies the destination address of the first packet from the former IP address into the current IP address according to former IP address and the current IP address in the first list of the first storage, and then transmits the first packet to the second mobile device via the second relay gateway device.

According to another embodiment of the present disclosure, an inter-domain handover method for mobile devices is provided. The inter-domain handover method for mobile devices is performed on an inter-domain handover system for mobile devices. The inter-domain handover system includes a first relay gateway device and a second relay gateway device directly or indirectly connected to the first relay gateway device, in which a packet transmission is performed between a first mobile device and a second mobile device, and the second mobile device switches from the first relay gateway device to the second relay gateway device. The inter-domain handover method includes: the second relay gateway determines that the second mobile device has joined the domain of the second relay gateway device; the second relay gateway device broadcasts a complex information of the second mobile device, in which the complex information includes an identification code and a current IP address; and the first relay gateway device updates a first list of the relay gateway device according to the complex information of the second mobile device. The identification code and the current IP address correspond to a former IP address of the second mobile device in the first list. When the first mobile device transmits a first packet to the second mobile device in which the destination address of the first packet is the former IP address, the first relay gateway device modifies the destination address of the first packet from the former IP address into the current IP address according to the former IP address and the current IP address in the first list, and then transmits the first packet to the second mobile device via the second relay gateway device.

An embodiment of the present disclosure provides a relay gateway device, including a processor and a storage connected to the processor. When a packet transmission is performed between a first mobile device and a second mobile device and the second mobile device switches from the relay gateway device to another relay gateway device, a list of the storage stores an identification code of the second mobile device, a former IP address of the second mobile device on the relay gateway device, and a current IP address of the second mobile device on the another relay gateway, wherein the identification code, the current IP address and the former IP address correspond to each other. When the first mobile device transmits a first packet to the second mobile device, in which the destination address of the first packet is the former IP address, the processor modifies the destination address of the first packet from the former IP address into the current IP address according to the former IP address and the current IP address of the second mobile device in the list, and then transmits the first packet to the second mobile device.

The present disclosure provides an inter-domain handover system, a method thereof, and a relay gateway device, in which when mobile devices switch between relay gateway devices, the relay gateway devices will exchange complex information and perform operations such as determining, comparing, updating, and creating a list of the complex information. When mobile devices switch between relay gateway devices while transmitting packets to each other, the relay gateway devices through which the packets are transmitted will determine whether or not to convert, relate, or modify some fields of the packets in such a manner that the packets can be transmitted to destination mobile devices, thereby achieving seamless information transmission.

In order to further the understanding of the present disclosure, the following embodiments are provided along with illustrations to facilitate the disclosure of the present disclosure.

DETAILED DESCRIPTION OF THE PREFERRED EMBODIMENTS

The aforementioned illustrations and following detailed description are exemplary for the purpose of further explaining the scope of the present disclosure. Other objectives and advantages related to the present disclosure will be illustrated in the following description and appended drawings.

It should be understood that, although terms such as "first" and "second" are used to describe the components of the present disclosure in the description below, the components are not limited by these terms. Instead, the use of these terms is merely for the purpose of distinguishing components from each other. On the other hands, the term "or" may indicate that any one of the listed items or all the possible combinations thereof are included.

Figure 1:
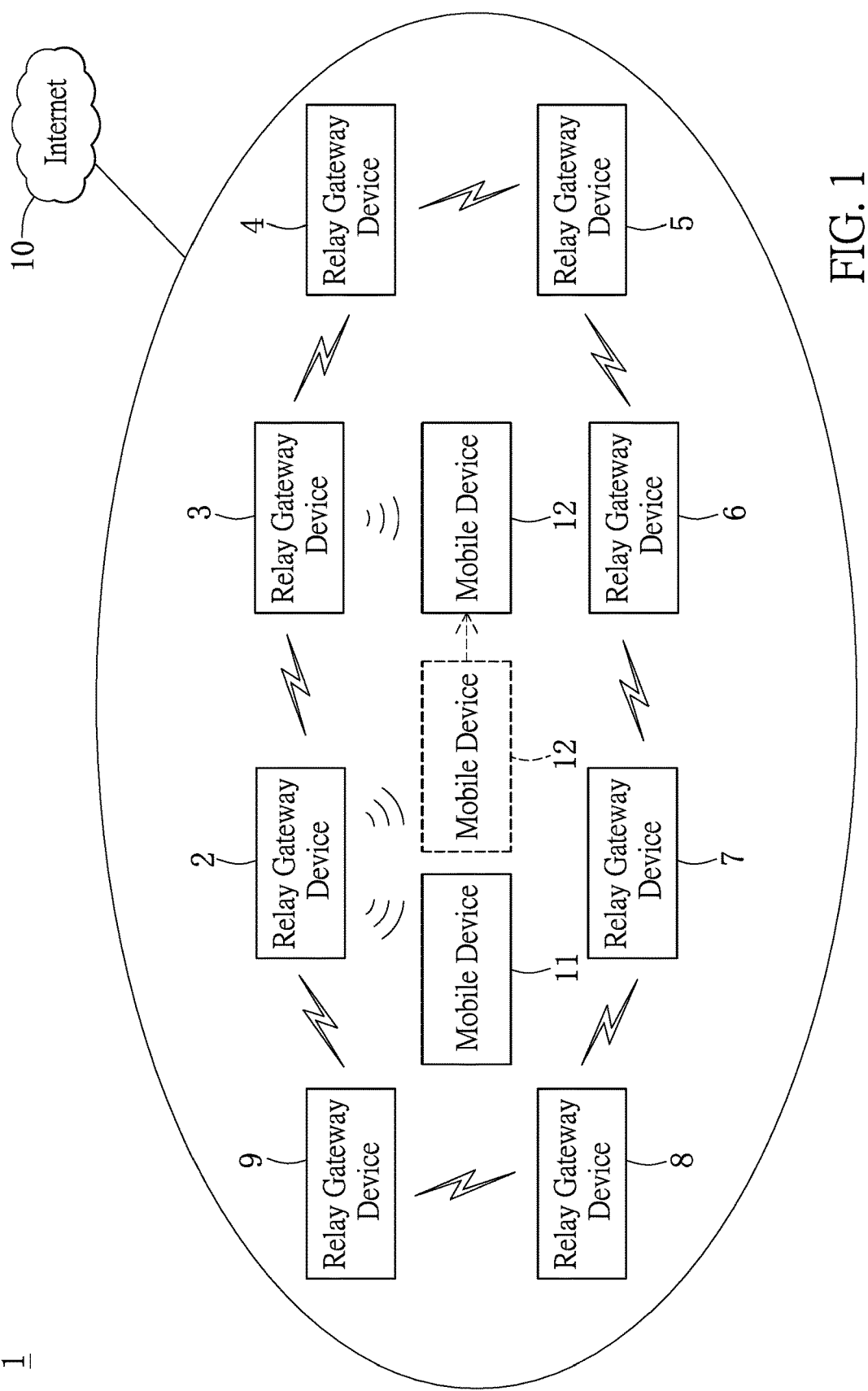
FIG. 1 is a schematic diagram illustrating an inter-domain handover system for mobile devices according to one embodiment of the present disclosure.
Figure 2:
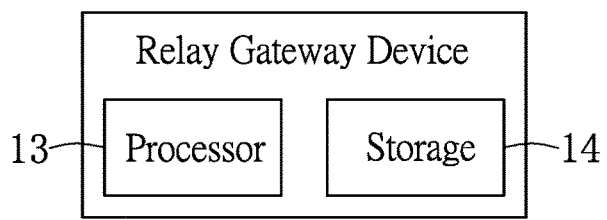
FIG. 2 is a system block diagram illustrating a relay gateway device according to one embodiment of the present disclosure.

Referring to FIG. 1, the inter-domain handover system 1 for mobile devices includes a plurality of relay gateway devices 2-9, which are connected to each other directly or indirectly. Each relay gateway devices 2-9 can be connected to the Internet 10; however, the present disclosure is not limited thereto. Besides, referring to FIG. 2, each relay gateway device 2-9 includes a processor 13 and a storage 14, and is connected to one another through a direct connect interface, such as LTE-D, Wi-Fi Direct, and is further connected to a mobile device via an access interface, such as LTE, Wi-Fi, Zigbee, Bluetooth. Moreover, the storage 14 of each relay gateway device 2-9 includes a list for recording activities of the mobile devices and the packets thereof.

Referring to FIG. 1, the mobile device 11 and the mobile device 12 are transmitting packets to each other under the domain of the relay gateway device 2; however, the present disclosure is not limited thereto. For instance, in other embodiments, the mobile device 11 and the mobile device 12 can transmit packets to each other when the mobile device 11 is associated to the domain of the relay gateway device 2 and the mobile device 12 is associated to that of the relay gateway device 3. The list of the storage 14 of the relay gateway device 2 stores the IP addresses of mobile device 11 and the mobile device 12 so that the packet transmitted from the mobile device 11 to the mobile device 12 contains the IP address of the mobile device 11 as the source address and the IP address of the mobile device 12 as the destination address, and the packet transmitted from the mobile device 12 to the mobile device 11 contains the IP address of the mobile device 12 as the source address and the IP address of the mobile device 11 as the destination address. The packet transmitted between the mobile device 11 and the mobile device 12 is bound to the IP address of one another so as to facilitate the packet transmission therebetween.

Figure 3:
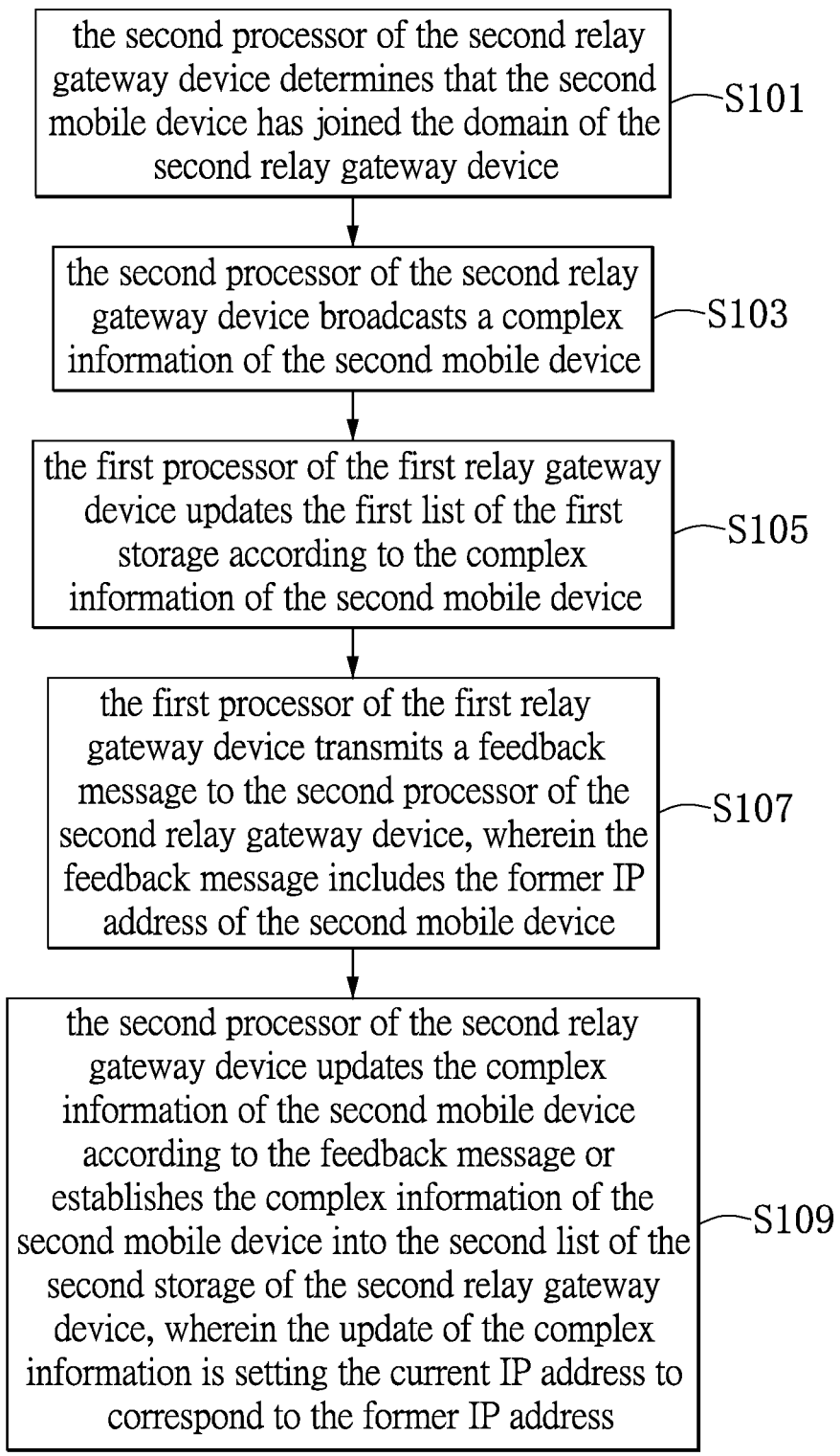
FIG. 3 is a flow chart illustrating an inter-domain handover method for mobile devices according to one embodiment of the present disclosure.

Referring to FIG. 3, in the present embodiment, the mobile device 12 switches from the relay gateway device 2 to the relay gateway device 3 while the mobile device 11 and the mobile device 12 are transmitting packets to each other. The inter-domain handover system of the present disclosure performs an inter-domain handover method, which includes a step S101: the processor 13 of the relay gateway device 3 determines that the mobile device 12 has joined the domain of the relay gateway device 3; a step S103: the processor 13 of the relay gateway device 3 broadcasts a complex information of the mobile device 12; a step S105: the processor 13 of the relay gateway device 2 updates the list of the storage 14 of the relay gateway device 2 according to the complex information of the mobile device 12. It should be noted that the complex information of the mobile device 12 includes a current IP address and an identification code. The identification code represents the mobile device 12. The identification code can be a media access control address (MAC Address), an international mobile equipment identity (IMEI), or an international mobile subscriber identity (IMSI).

In steps S101 and S103, after the mobile device 12 switches from the relay gateway device 2 to the relay gateway device 3, the processor 13 of the relay gateway device 3 is triggered by the mobile device 12 such that the processor 13 determines that the mobile device 12 has joined the domain of the relay gateway device 3, upon which the processor 13 establishes the complex information of the mobile device 12 into the storage 14 of the relay gateway device 3. After obtaining the complex information of the second mobile device 12, the processor 13 of the relay gateway device 3 broadcasts the complex information to other relay gateway devices.

In step S105, after receiving the complex information of the mobile device 12 broadcasted by the processor 13 of the relay gateway device 3, the processor 13 of the relay gateway device 2 determines that the mobile device 12 already exists on the list of the storage 14 of the relay gateway device 2, that is to say, the mobile device 12 had been under the domain of the relay gateway device 2. Next, the processor 13 of the relay gateway device 2 updates the list of the storage 14 of the relay gateway device 2 according to the complex information of the mobile device 12. As shown in table 1 below, the way the list of the storage 14 of the relay gateway device 2 is updated is to add the current IP address of the mobile device 12 into the list such that the identification code, the current IP address and the former IP address correspond to each other. It should be noted that the processor 13 of the relay gateway device 2 determines whether the mobile device 12 had been under the domain of the relay gateway device 2 according to the identification code in the complex information of the mobile device 12. In the present embodiment, the processor 13 of the relay gateway device 2 identifies the same identification code, e.g. a MAC address, in both the complex information of the mobile device 12 and the list of the storage 14 of the relay gateway device 2 based on a comparison therebetween, thereby determining that the mobile device 12 had been under the domain of the relay gateway device 2. Furthermore, the list of the storage 14 of the relay gateway device 2 includes the identification code of the mobile device 12 and the former IP address before the handover, and after the handover, the processor 13 of the relay gateway device 2 updates the list of the storage 14 of the relay gateway device 2 such that the current IP address of the mobile device 12 is established into the list, and the former IP address, the identification code, and the current IP address correspond to each other. In another embodiment, the processor 13 of the relay gateway device 4 receives the complex information of the mobile device 12 broadcasted by the processor 13 of the relay gateway device 3, and determines that the mobile device 12 has never been under the domain of the relay gateway device 4 based on a comparison between the complex information of the mobile device 12 and the list of the storage 14 of the relay gateway device 4, in which the processor 13 of the relay gateway device 4 did not find the identification code of the mobile device 12 in the list of the storage 14 of the relay gateway device 4. Afterwards, the processor 13 of the relay gateway device 4 broadcasts the complex information of the mobile device 12 to other relay gateway devices.

TABLE 1

| Former IP Address | Identification Code (e.g. MAC Address) | Current IP Address |
|---|---|---|
| 192.168.0.4 | 00-05-5D-E8-0F-A3 | 192.168.2.8 |

In the present embodiment, as shown in FIG. 1, the mobile device 12 switches from the relay gateway device 2 to the relay gateway device 3 while the mobile device 11 and the mobile device 12 are transmitting packets to each other under the domain of the relay gateway device 2. After the handover, if the mobile device 11 transmits a packet with the former IP address as the destination address to the mobile device 12, the processor 13 of the relay gateway device 2 will modify the destination address of the packet from the former IP address to the current IP address according to the former IP address and the current IP address stored in the list of the storage 14 of the relay gateway device 2, and transmit the packet to the mobile device 12 via the relay gateway device 3. In the list of the storage 14 of the relay gateway device 2, the identification code, the former IP address and the current IP address correspond to each other.

In another embodiment, the mobile device 12 switches from the relay gateway device 2 to the relay gateway device 3 and then back to relay gateway device 2 while the mobile device 11 and the mobile device 12 are transmitting packets to each other. After the mobile device 12 has switched back to the relay gateway device 2, the processor 13 of the relay gateway device 2 determines that the mobile device 12 has joined the domain of the relay gateway device 2 and then establishes the complex information of the mobile device 12, which includes an identification code and a current IP address, into the list of the storage 14 of the relay gateway device 2. Afterwards, the processor 13 of the relay gateway device 2 determines that the identification code of the mobile device 12 already exists on the list of the storage 14 of the relay gateway device 2, and then updates the list of the storage 14 of the relay gateway device 2 according to the complex information of the mobile device 12. That is to say, according to the identification code of the mobile device 12 on the list of the storage 14 of the relay gateway device 2, the processor 13 of the relay gateway device 2 retrieves the new IP address and the former IP address of the mobile device 12 from the list of the storage 14 of the relay gateway device 2, and then deletes the current IP address from the list so that the mobile device 12 can transmit and receive packets using the former IP address.

In another embodiment, the mobile device 12 switches from the relay gateway device 3 to the relay gateway device 4 while the mobile device 11 and the mobile device 12 are transmitting packets to each other. After the mobile device 12 has switched to the relay gateway device 4, the processor 13 of the relay gateway device 4 determines that the mobile device 12 has joined the domain of the relay gateway device 4, and then establishes the complex information of the mobile device 12, which includes an identification code and a current IP address of the mobile device 12, into the list of the storage 14 of the relay gateway device 4. Next, the processor 13 of the relay gateway device 4 broadcasts the complex information of the mobile device 12, which is then received by the processor 13 of the relay gateway device 3. Afterwards, the processor 13 of the relay gateway device 3 determines that the complex information of the mobile device 12 already exists on the list of the storage 14 of the relay gateway device 3, and then updates the list of the storage 14 of the relay gateway device 3 according to the complex information of the mobile device 12, that is to say, the processor 13 of the relay gateway device 3 adds the current IP address into the list of the storage 14 of the relay gateway device 3. After the update of the list, the identification code, the current IP address and the former IP address of the mobile device 12 correspond to each other.

Furthermore, referring to FIG. 3, the inter-domain handover method performed by the inter-domain handover system further includes a step S107: the processor 13 of the relay gateway device 2 transmits a feedback message, which includes the former IP address of the mobile device 12, to the processor 13 of the relay gateway device 3; a step S109: the processor 13 of the relay gateway device 3 updates or establishes the complex information of the mobile device 12 into the list of the storage 14 of the relay gateway device 3 according to the feedback message in a manner such that the current IP address and the former IP address correspond to each other after the update of the list. It should be noted that, in step S109, the processor 13 of the relay gateway device 3 will update the list of the storage 14 according to the feedback message if the relay gateway device 3 had established the complex information of the mobile device 12 into the list of the storage 14 before receiving the feedback message. On the other hand, the processor 13 of the relay gateway device 3 will establish the complex information of the mobile device 12 into the list of the storage 14 according to the feedback message if the processor 13 has never established the complex information of the mobile device 12 into the list of the storage 14 before receiving the feedback message.

In another embodiment, the mobile device 12 switches from the relay gateway device 3 to the relay gateway device 2 while the mobile device 11 and the mobile device 12 are transmitting packets to each other, with the mobile device 11 and the mobile device 12 being connected to the relay gateway device 2 and the relay gateway device 3 respectively. Through the performance of steps S107 and S109, the processor 13 of the relay gateway device 2 updates a list in the storage 14 of the relay gateway device 2 according to a feedback message transmitted by the relay gateway device 3, in which the list includes the identification code, the current IP address and the former IP address of the mobile device 12 that correspond to each other after the update of the list. After step S109 is performed, whenever the mobile device 11 transmits a packet to the mobile device 12, the processor 13 of the relay gateway device 2 will determine that the destination address of the packet is under its own domain, and then the processor 13 will transmit the packet to the mobile device 12 directly instead of transmitting the packet to the mobile device 12 via the relay gateway device 3, thereby increasing the packet transmission rate.

In summary, the inter-domain handover system, a method thereof, and a relay gateway device provided by the present disclosure can achieve the effect that, regardless of whether the packet transmission between the mobile device 11 and the mobile device 12 are performed in the same domain or in two different domains, when the mobile device 12 switches from one domain to another, the relay gateway device connected to the mobile device 12 before the handover will perform an IP address replacement on the packets in a manner such that the mobile device 11 and the mobile device 12 can transmit and receive packets with the former IP address being the destination address as well as the source address, thereby achieving seamless information transmission and avoiding packet loss at the handover due to the change of the IP address.

The description illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. An inter-domain handover system for mobile devices, comprising a first relay gateway device and a second relay gateway device directly or indirectly connected to the first relay gateway device, the first relay gateway device including a first processor and a first storage, the second relay gateway device including a second processor and a second storage, wherein a packet transmission is performed between a first mobile device and a second mobile device through the first relay gateway device, and the second mobile device switches from the first relay gateway device to the second relay gateway device; the inter-domain handover system performs an inter-domain handover method for mobile devices, the inter-domain handover method including:

the second processor determines that the second mobile device has joined the domain of the second relay gateway device;

the second processor broadcasts a complex information of the second mobile device, wherein the complex information includes an identification code and a current IP address, and the first processor updates a first list of the first storage according to the complex information of the second mobile device, wherein after the step in which the first processor updates a first list of the first storage according to the complex information of the second mobile device, the identification code, the current IP address and a former IP address of the second mobile device in the first list correspond to each other, and wherein when the first mobile device transmits a first package to the second mobile device in which the destination address of the first package is the former IP address, the first processor modifies the destination address of the first packet from the former IP address into the current IP address according to the former IP address and the current IP address in the first list of the first storage, and then transmits the first packet to the second mobile device via the first relay gateway device and the second relay gateway device.

2. The inter-domain handover system according to claim 1, wherein after the first processor updates the first list of the first storage according to the complex information of the second mobile device, the inter-domain handover method further includes:

the first processor transmits a feedback message to the second processor, wherein the feedback message includes the former IP address of the second mobile device; and the second processor updates or establishes the complex information of the second mobile device into a second list of the second storage according to the feedback message, wherein the identification code, the current IP address and the former IP address in the second list correspond to each other.

3. The inter-domain handover system according to claim 1, wherein after the second processor determines that the second mobile device has joined the domain of the second relay gateway device, the inter-domain handover method further includes: the second processor establishes the complex information of the second mobile device into a second list of the second storage.

4. The inter-domain handover system according to claim 3, wherein the second processor determines that the destination address of the first packet is located under the domain of the second relay gateway device according to the current IP address of the second mobile device, and the second processor transmits the first packet directly to the second mobile device instead of the first relay gateway device.

5. The inter-domain handover system according to claim 1, wherein the identification code of the second mobile device further includes a media access control address (MAC Address), an international mobile equipment identity (IMEI), or an international mobile subscriber identity (IMSI).

6. The inter-domain handover system according to claim 1, wherein when the second mobile device transmits a second packet to the first mobile device and the source address of the second packet is the current IP address, the first processor modifies the source address of the second packet from the current IP address into the former IP address and then transmits the second packet to the first mobile device.

7. An inter-domain handover method for mobile devices, which is performed on an inter-domain handover system for mobile devices, the inter-domain handover system including a first relay gateway device and a second relay gateway device directly or indirectly connected to the first relay gateway device, wherein a packet transmission is performed between a first mobile device and a second mobile device through the first relay gateway device, and the second mobile device switches from the first relay gateway device to the second relay gateway device, the inter-domain handover method comprising:

the second relay gateway determines that the second mobile device has joined the domain of the second relay gateway device;

the second relay gateway device broadcasts a complex information of the second mobile device, wherein the complex information includes an identification code and a current IP address; and the first relay gateway device updates a first list of the relay gateway device according to the complex information of the second mobile device, wherein the identification code, the current IP address, and a former IP address of the second mobile device in the first list correspond to each other, and when the first mobile device transmits a first packet to the second mobile device in which the destination address of the first packet is the former IP address, the first relay gateway device modifies the destination address of the first packet from the former IP address into the current IP address according to the former IP address and the current IP address in the first list, and then transmits the first packet to the second mobile device via the first relay gateway device and the second relay gateway device.

8. The inter-domain handover method according to claim 7, wherein after the first relay gateway device updates the first list of the first relay gateway device according to the complex information of the second mobile device, the inter-domain handover method further includes:

the first relay gateway device transmits a feedback message to the second relay gateway device, wherein the feedback message includes the former IP address of the second mobile device; and the second relay gateway device updates or establishes the complex information of the second mobile device into a second list according to the feedback message, wherein the identification code, the current IP address, and the former IP address in the second list correspond to each other.

9. The inter-domain handover method according to claim 7, wherein after the second relay gateway device determines that the second mobile device has joined the domain of the second relay gateway device, the inter-domain handover method further includes:

the second relay gateway device establishes the complex information of the second mobile device into a second list of the second relay gateway device.

10. The inter-domain handover method according to claim 9, wherein the second relay gateway device determines that the destination address of the first packet is located under the domain of the second relay gateway device according to the current IP address of the second mobile device, and the second relay gateway device transmits the first packet directly to the second mobile device instead of the first relay gateway device.

11. The inter-domain handover method according to claim 7, wherein the identification code of the second mobile device further includes a media access control address (MAC Address), an international mobile equipment identity (IMEI), or an international mobile subscriber identity (IMSI).

12. The inter-domain handover method according to claim 7, wherein when the second mobile device transmits a second packet to the first mobile device and the source address of the second packet is the current IP address, the first relay gateway device modifies the source address of the second packet from the current IP address into the former IP address and then transmits the second packet to the first mobile device.

13. A relay gateway device, comprising:

a processor; and a storage connected to the processor, wherein when a packet transmission is performed between a first mobile device and a second mobile device through the relay gateway device, and the second mobile device switches from the relay gateway device to another relay gateway device, a list of the storage stores an identification code of the second mobile device, a former IP address of the second mobile device on the relay gateway device, and a current IP address of the second mobile device on the another relay gateway, wherein the identification code, the current IP address, and the former IP address correspond to each other, and wherein when the first mobile device transmits a first packet to the second mobile device in which the destination address of the first packet is the former IP address, the processor modifies the destination address of the first packet from the former IP address into the current IP address according to the former IP address and the current IP address of the second mobile device in the list, and then transmits the first packet to the second mobile device via the relay gateway device and the another relay gateway device.

14. The relay gateway device according to claim 13, wherein the identification code of the second mobile device further includes a media access control address (MAC Address), an international mobile equipment identity (IMEI), or an international mobile subscriber identity (IMSI).

15. The relay gateway device according to claim 13, wherein when the second mobile device transmits a second packet to the first mobile device and the source address of the second packet is the current IP address, the processor modifies the source address of the second packet from the current IP address into the former IP address and then transmits the second packet to the first mobile device.

16. The relay gateway device according to claim 13, wherein when the packet transmission is performed between the first mobile device and the second mobile device and the second mobile device switches from the another relay gateway device to the relay gateway device, the processor deletes the current IP address of the second mobile device from the list.

* * * * *